(12) United States Patent
He et al.

(10) Patent No.: US 8,150,640 B2
(45) Date of Patent: Apr. 3, 2012

(54) METHOD FOR STATE ESTIMATION BASED ON THE MEASURED DATA OF THE DATA-ACQUISITION SYSTEM IN POWER SYSTEM

(75) Inventors: Guangyu He, Beijing (CN); Shufeng Dong, Beijing (CN); Yingyun Sun, Beijing (CN); Shengwei Mei, Beijing (CN); Wei Wang, Shanghai (CN); Wangjun Zhang, Shanghai (CN)

(73) Assignees: Tsinghua University, Beijing (CN); Shanghai Municipal Electric Power Company, Shanghai (CN)

( * ) Notice: Subject to any disclaimer, the term of this patent is extended or adjusted under 35 U.S.C. 154(b) by 293 days.

(21) Appl. No.: 12/475,223

(22) Filed: May 29, 2009

(65) Prior Publication Data

US 2010/0094574 A1  Apr. 15, 2010

(30) Foreign Application Priority Data

Oct. 10, 2008 (CN) .......................... 2008 1 0223766

(51) Int. Cl.
 *G01R 15/00* (2006.01)
 *G01R 25/00* (2006.01)
(52) U.S. Cl. ........................................... 702/57; 702/65
(58) Field of Classification Search .................... 702/62, 702/57, 65; 324/713
 See application file for complete search history.

(56) References Cited

U.S. PATENT DOCUMENTS 3,903,402 A * 9/1975 Petit et al. .......................... 700/6
 2009/0228154 A1 * 9/2009 Trias ............................. 700/295

OTHER PUBLICATIONS

Hui Xue, et al., "A Dynamic State Estimation Method with PMU and SCADA Measurement for Power Systems", The 8th International Power Engineering Conference (IPEC 2007).

Jose Beleza Carvalho, et al., "A Modern State Estimation in Power System Energy", summary, Electric Power Engineering, 1999.

S.-S. Lin, et al. "An Efficient Algorithm for Solving Distributed State Estimator and Laboratory Implementation", Proceedings of the 2005 11th International Conference on Parallel and Distributed Systems (ICPADS'05), IEEE.

(Continued)

*Primary Examiner* — Mohamed Charioui
*Assistant Examiner* — Manuel Rivera Vargas
(74) *Attorney, Agent, or Firm* — David W. Carstens; Zachary W. Hilton; Carstens & Cahoon, LLP (57) ABSTRACT

The method for state estimation based on the measured data of data-acquisition system in electric power system relates to the field of power system analysis technique, characterized in that the method comprises: distributing the said measured data into an operating power system to form a calculation model, defining the injection power of the link nodes as 0 and taking the maximum active power output, maximum reactive power output of the generator as the constraints, constructing a mathematic model for estimation, resolving the optimum solution of the voltage amplitude and voltage phase angle for every node, and calculating the estimated values of the voltage, the active power and the reactive power by using the optimum solution of the state variables, if the difference between the measured value and the estimated value was less than a parameter α that is predetermined under different voltage levels, the estimated value is qualified. The estimation criterion provided by the present invention is unlikely affected by bad data with a strong capability of robust, improving the correctness of the estimation.

4 Claims, 3 Drawing Sheets

OTHER PUBLICATIONS

A. Monticelli, "Electric Power System State Estimation", Proceedings of the IEEE, vol. 88, No. 2 Feb. 2000.

E. A. Blood, et al., "Electric Power System Static State Estimation through Kalman Filtering and Local Forecasting", © 2008 IEEE.

R. Baldick, "Implementing Nonquadratic Objective Functions for State Estimation and Bad Data Rejection", IEEE Transactions on Power Systems, vol. 12, No. 1, Feb. 1997.

Yoshihiko Ejima, et al., "New Bad Data Rejection Algorithm using Nonquadratic Objective Function for State Estimation", © 2007 IEEE.

Kishore Chitte, et al. "Power System State Estimation Using IP Barrier Method", @2003IEEE D. M. Falcao, et al., "Power System Tracking State Estimation and Bad Data Processing", IEEE Transactions on Power Apparatus and Systems, vol. PAS-101, No. 2 Feb. 1982.

Fang Chen, et al., "State Estimation Model and Algorithm Including PMU", DRPT2008 Apr. 6-9, 2008 Nanjing China.

C. Rakpenthai, et al., "State Estimation of Power System with UPFC Using Interior Point WLAV Method", 2006 IEEE.

* cited by examiner

METHOD FOR STATE ESTIMATION BASED ON THE MEASURED DATA OF THE DATA-ACQUISITION SYSTEM IN POWER SYSTEM

CROSS-REFERENCE TO RELATED APPLICATIONS

This application claims priority benefit of Chinese Application No. 200810223766.0 filed on Oct. 10, 2008.

TECHNICAL FILED

The present invention relates to the field of power system analysis and calculation.

BACKGROUND ART

The state estimation, sometimes referred to as wave filtering, improves the accuracy of the data by using the redundancy of the real-time measurement system, eliminates the wrong information caused by the random disturbance automatically, estimates or forecasts the operation state of the system. The function of the state estimation is to convert the raw data with low accuracy, imperfection and bad data into processed integral and reasonable data with little error. The chief task of the state estimation is to construct a network model using the telemetry information and remote signaling information of the real-time measurement system according to switch state, and to make raw-detection on real-time measurement data to eliminate the bad data and supplement the deficient measuring points with pseudo measurement to ensure the redundancy, thus estimating the system state, calculating the power flow distribution, meanwhile analyzing the operation state of the system using calculated results, enhancing the observability of the whole network.

It has been more than 30 years since the traditional method for state estimation was established by Fred Charles Schweppe of MIT in 1970. Different state estimators have different estimation criterions according to different objective functions used during the process of resolving the state variables. Presently, the estimation criterions used in power system comprises WLS (weighted least square) criterion, non-quadratic criterion, WLAV (weighted least absolute value), LMS (least median of squares) and LTS (least trimmed squares). The most widely-used criterion is the WLS estimation criterion, which has such advantages as simple model, small computational amount, and excellent statistical properties including optimal un-bias property on estimating measurement values of the ideal normal distribution. However, the disadvantage is its bad capability of robust, that is to say, the estimation result is easily affected by bad data and is far from the true value. Non-quadratic criterion, WLAV, LMS and LTS estimator are all robust estimators having notably high capability of robust, but such disadvantages as large computational amount and requiring to subjectively determined weighted factors are important factors that hinder the development of the robust estimators.

The present invention provides a method for state estimation in power system, which provides an estimation criterion with good capability of robust that can reflect the real distributing condition of the measurement error, constructs an optimal mathematical model based on the above estimation criterion with improved correctness of estimation by adding the injection power of link nodes into constraint conditions as the equality constraints, gives a principle for setting parameters in objective functions and a method for setting an initial value when resolving the said optimization problem.

CONTENT OF THE INVENTION

The objective of the present invention is to provide a method for state estimation based on real-time measurement in power system.

1. A method for state estimation based on the measured data of the data-acquisition system in power system is characterized by its implementation on computer as follows:

Block 1, acquiring the network parameters of the power system from the energy management system, the said network parameters comprising the branch number, head node number and end node number of the power transmission lines, the series resistance, the series reactance, the parallel conductance, the parallel susceptance, and the ratio and impedance of the transformer;

Block 2, acquiring the telemetry measurement value and the remote signaling measurement value from the network data server of Supervisory Control and Data Acquisition (SCADA), wherein, The analog telemetry measurements comprise voltage amplitude, active power of the generator, reactive power of the generator, active power of the load, reactive power of the load, active power of the first end of the line, reactive power of the first end of the line, active power of the tail end of the line, reactive power of the tail end of the line and current amplitude of the line, The remote signaling measurements comprise the switch state of the switches and the disconnecting links and the position of the transformer taps. The measurement is 1 when the switch or the disconnecting link is closed, and the value is 0 when the switch or the disconnecting link is open, The data acquisition of the said SCADA system is implemented by polling mode with a cycle time of 5~10 seconds, each of the measuring points includes at least the type, the point number and the measurement value;

Block 3, constructing a computational model;

Block 3.1, defining the ports of the switches, the power transmission lines, the transformers, the generators, the capacitors and the loads as nodes, traversing these nodes, merging the nodes connected together by closed switches or disconnecting links in the network into one node used for calculation according to the switching values, all the following nodes refer to the nodes used for calculation, Block 3.2, distributing the voltage amplitude measurements, the generator power measurements and the load power measurements acquired from block 2 to their corresponding nodes according to the ways as follows:

Averaging to get the voltage amplitude measurement value if the said nodes include a plurality of voltage amplitude measurement values, Adopting generator power from which the load power is taken away to be the injection power of the node, only if the power measurement happened on all the generators and loads on the said node;

Block 4, taking the voltage amplitude and voltage phase angle of the node as state variable x, and taking one of the nodes as the reference node of the voltage phase angle, then resolving the following equations to get an optimal solution "x*" of the said state variable:

Block 4.1, defining the nodes without a generator nor a load as link nodes, the said link nodes form a set A while the generator nodes form a set E, defining $P_{kmax}$ and $Q_{kmax}$ to indicate the maximum active power output and the maximum reactive output of the generator node k respectively, Block 4.2, resolving the optimal resolution x* by adopting following optimization model:

$$\min \sum_{i=1}^{m} \left( \frac{1}{1+e^{-\beta_i(z_i-h_i(x)-a_i)}} + \frac{1}{1+e^{\beta_i(z_i-h_i(x)+a_i)}} \right)$$

$$\text{s.t.} \begin{cases} \sum_{j \in t} v_t v_j (G_{tj}\cos\theta_{tj} + B_{tj}\sin\theta_{tj}) = 0 \\ \sum_{j \in t} v_t v_j (G_{tj}\sin\theta_{tj} - B_{tj}\cos\theta_{tj}) = 0 \end{cases} (t \in A)$$

$$\begin{cases} \sum_{l \in k} v_k v_l (G_{kl}\cos\theta_{kl} + B_{kl}\sin\theta_{kl}) \le P_{k\ max} \\ \sum_{l \in k} v_k v_l (G_{kl}\sin\theta_{kj} - B_{kl}\cos\theta_{kl}) \le Q_{k\ max} \end{cases} (k \in E).$$

Wherein, A is a set consisting of link nodes, E is a set consisting of generator nodes, $v_i, v_j, v_k$ and $v_l$ are the voltage amplitudes of node t, node j, node k and node l respectively, j∈t denotes that node j is connected with node j by a line, l∈k denotes that node l is connected with node k by a line, node t is a link node, node k is a generator node, $G_{tj}, B_{tj}, G_{kl}, B_{kl}$ are elements of the admittance matrix, $\theta_{tj}$ is the voltage phase angle difference between node t and node j, $\theta_{kl}$ is the voltage phase angle difference between node k and node l, $z_i$ is the measurement value under the i-th measurement, $h_i(x)$ is the measurement function under the i-th measurement, $\alpha_i$ is a parameter related to the i-th measurement;

for the voltage measuring points: $\alpha_i = 0.02 \times |z_{ibase}|$, for the active power measuring points: $\alpha_i = 0.02 \times |z_{ibase}|$, for the reactive power measuring points: $\alpha_i = 0.03 \times z_{ibase}|$, The value of $z_{ibase}$ is related to the i-th measurement and is predetermined corresponding to different voltage levels, $\beta_i$ is the parameter related to the said $\alpha_i$, $\beta_i = c/\alpha_i$, c is a constant, c=5~10;

Block 5, calculating the estimated value by using the formula z*=h(x*) according to the optimal solution x* derived from block 4, The voltage amplitude of node i is: $h(x^*) = v^*_i$, The active injection power of node i is:

$$h(x^*) = \sum_{j \in i} v_i^* v_j^* (G_{ij}\cos(\theta_i^* - \theta_j^*) + B_{ij}\sin(\theta_i^* - \theta_j^*)),$$

The reactive injection power of node i is $$h(x^*) = \sum_{j \in i} v_i^* v_j^* (G_{ij}\sin(\theta_i^* - \theta_j^*) - B_{ij}\cos(\theta_i^* - \theta_j^*)),$$

$v^*_i, v^*_j, \theta^*_i, \theta^*_j$ are all the optimized solutions of the state variable which can be represented by x*;

Block 6, determining whether each of the estimated values of the measurement is qualified or not according to the following formula:

If $|z_i - z_i^*| \le \alpha_i$, the estimated value is qualified.

2. The method for state estimation based on the measured data of the data-acquisition system in power system of claim 1, characterized in that, the said $z_{ibase}$ under the line power measurement values as follows: values 1083 MVA under the voltage level of 500 kv, values 686 MVA under the voltage level of 330 kv, values 305 MVA under the voltage level of 220 kv values 114 MVA under the voltage level of 110 kv, values 69.7 MVA under the voltage level of 66 kv.

3. The method for state estimation based on the measured data of the data-acquisition system in power system of claim 1, characterized in that, the said $z_{ibase}$ under the voltage amplitude measurement values as follows: values 600 kv under the voltage level of 500 kv, values 396 kv under the voltage level of 330 kv, values 264 kv under the voltage level of 220 kv, values 132 kv under the voltage level of 110 kv, values 79.2 kv under the voltage level of 66 kv.

4. The method for state estimation based on the measured data of the data-acquisition system in power system of claim 1, characterized in that, the said $z_{ibase}$ under the generator power measurement values apparent power of the generator.

The proposed method for state estimation can be applied to EMS of regional power and provincial power network, and can also be applied to the monitoring, analysis and control system of power system based on real-time measured data.

EMBODIMENTS

SCADA, the Supervisory Control and Data Acquisition system is a real-time data source for power system automation which provides real-time measured data of power system. The SCADA measurement includes the telemetry measurement indicative of measurement of analog quantity and the remote signaling measurement indicative of measurement of discrete quantity. The telemetry measurement equation in power system can be represented as follows:

$$z = h(x) + v \quad (1)$$

Wherein, z is the vector of the measurement value; h(x) is the vector of the measurement function; v is the vector of the measurement error; assuming the number of the total measurements as m, then all the above vectors have m dimensions; x is a state variable, assuming the number of the nodes in the system as n, adopting the voltage amplitude and the voltage phase angle of the nodes as the state variables, and taking one of the nodes as the reference node of the voltage phase angle, then x has 2n−1 dimensions, equation (2) to equation (12) are measurement functions for some common measurements respectively:

The injection power $P_i, Q_i$ of node i can be represented as follows:

$$P_i = \sum_{j \in i} v_i v_j (G_{ij}\cos\theta_{ij} + B_{ij}\sin\theta_{ij}) \quad (2)$$

$$Q_i = \sum_{j \in i} v_i v_j (G_{ij}\sin\theta_{ij} - B_{ij}\cos\theta_{ij}) \quad (3)$$

The power flow of node i side on line i-j can be represented as follows:

$$P_{ij} = v_i^2 g - v_i v_j g \cos\theta_{ij} - v_i v_j b \sin\theta_{ij} \quad (4)$$

$$Q_{ij} = -v_i^2(b+y_c) - v_i v_j g \sin\theta_{ij} + v_i v_j b \cos\theta_{ij} \quad (5)$$

The power flow of node j side on line i-j can be represented as follows:

$$P_{ji} = v_j^2 g - v_i v_j g \cos\theta_{ij} + v_i v_j b \sin\theta_{ij} \quad (6)$$

$$Q_{ji} = -v_j^2(b+y_c) + v_i v_j g \sin\theta_{ij} + v_i v_j b \cos\theta_{ij} \quad (7)$$

The power flow of node i side on transformer branch i-j can be represented as follows:

$$P_{ij} = -\frac{1}{K} v_i v_j b_T \sin\theta_{ij} \quad (8)$$

$$Q_{ij} = -\frac{1}{K^2} v_i^2 b_T + \frac{1}{K} v_i v_j \cos\theta_{ij} \quad (9)$$

The power flow of node j side on transformer branch i-j can be represented as follows:

$$P_{ij} = \frac{1}{K} v_i v_j b_T \sin\theta_{ij} \quad (10)$$

$$Q_{ij} = -v_j^2 b_T + \frac{1}{K} v_i v_j \cos\theta_{ij} \quad (11)$$

The voltage amplitude measurement of node i can be represented as follows:

$$U_i = v_i \quad (12)$$

Figure 1:
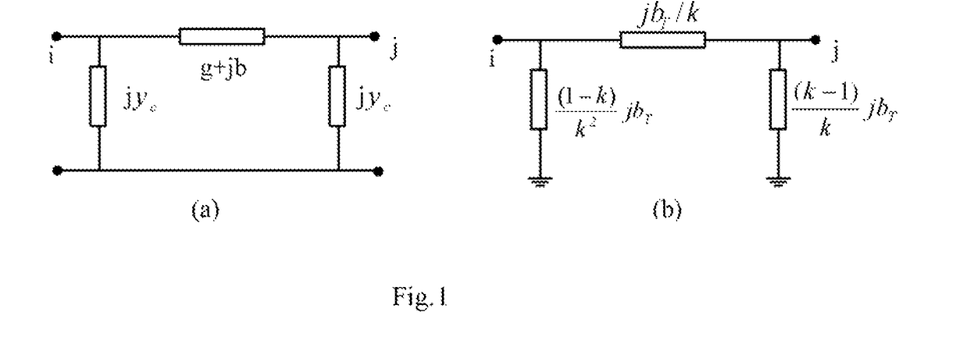
FIG. 1 is a equivalent circuit diagram of the electric elements, wherein, FIG. (a) is a π-type equivalent circuit diagram of the line, FIG. (b) is a π-type equivalent circuit diagram of the transformer.

$v_i$, $v_j$ in the measurement functions above are voltage amplitudes of node i and node j respectively, $\theta_{ij}$ is the voltage phase angle difference between node i and node j, $G_{ij}$, $B_{ij}$ are admittance matrix elements, g, b, $y_c$ are parameters in π-type model of the line, k is the non-standard voltage ratio of the transformer, $b_T$ is the standard measured susceptance of the transformer, the π-type equivalent circuit diagram of the line and the transformer is shown in FIG. 1.

The nodes without neither a generator nor a load are referred to as link nodes, assuming a set A consisting of link nodes, a set E consisting of generator nodes, $P_{kmax}$ and $Q_{kmax}$ are used to denote the maximum active power output and the maximum reactive power output of the i-th generator, respectively, adopting the optimization data model as follows:

$$\min \sum_{i=1}^{m} \left( \frac{1}{1 + e^{-\beta_i(z_i - h_i(x) - a_i)}} + \frac{1}{1 + e^{\beta_i(z_i - h_i(x) + a_i)}} \right) \quad (13)$$

$$\text{s.t.} \begin{cases} \sum_{j \in t} v_t v_j (G_{tj}\cos\theta_{tj} + B_{tj}\sin\theta_{tj}) = 0 \\ \sum_{j \in t} v_t v_j (G_{tj}\sin\theta_{tj} - B_{tj}\cos\theta_{tj}) = 0 \end{cases} (t \in A)$$

$$\begin{cases} \sum_{l \in k} v_k v_l (G_{kl}\cos\theta_{kl} + B_{kl}\sin\theta_{kl}) \leq P_{k\ max} \\ \sum_{l \in k} v_k v_l (G_{kl}\sin\theta_{kj} - B_{kl}\cos\theta_{kl}) \leq Q_{k\ max} \end{cases} (k \in E)$$

$\alpha_i$, $\beta_i$ in equation (13) are parameters related to the i-th measurement which value according to the following principles 1. $\alpha_i$ values according to principles as follows
   measuring points for voltage measurement: $\alpha_i = 0.02 \times |z_{ibase}|$
   measuring points for active power measurement: $\alpha_i = 0.02 \times |z_{ibase}|$
   measuring points for reactive power measurement: $\alpha_i = 0.03 \times |z_{ibase}|$
   the value of $z_{ibase}$ relates to the i-th measurement and values according to following principles:
   a) $z_{ibase}$ for the line power measurement, values 1083 MVA under the voltage level of 500 kv, values 686 MV under the voltage level of 330 kv, values 305 MVA under the voltage level of 220 kv, values 114 MVA under the voltage level of 110 kv, values 69.7 MVA under the voltage level of 66 kv;
   b) $z_{ibase}$ for the voltage amplitude measurement, values 600 kv under the voltage level of 500 kv, values 396 kv under the voltage level of 330 kv, values 264 kv under the voltage level of 220 kv, values 132 kv under the voltage level of 110 kv, values 79.2 kv under the voltage level of 66 kv;
   c) $z_{ibase}$ for the generator power measurement values generator apparent power.

2. $\beta_i$ values according to the principles as follows:
   $\beta_i = c/\alpha_i$, c is a constant which values ranging from 5 to 10 in the present invention.

When the deviation between the estimated value and the measurement value in the i-th measurement meets the formula that $|z_i - h_i(x)| \leq \alpha_i$, the estimated value of the measuring point can be considered as qualified according to the SGCC (State Grid Corporation of China) standard used for determining whether the estimated value of the measuring point is qualified.

Assuming the optimum solution as x* and calculating the estimated value of the measurement using the formula z*=h(x*), then the whole computation is finished.

Figure 2:
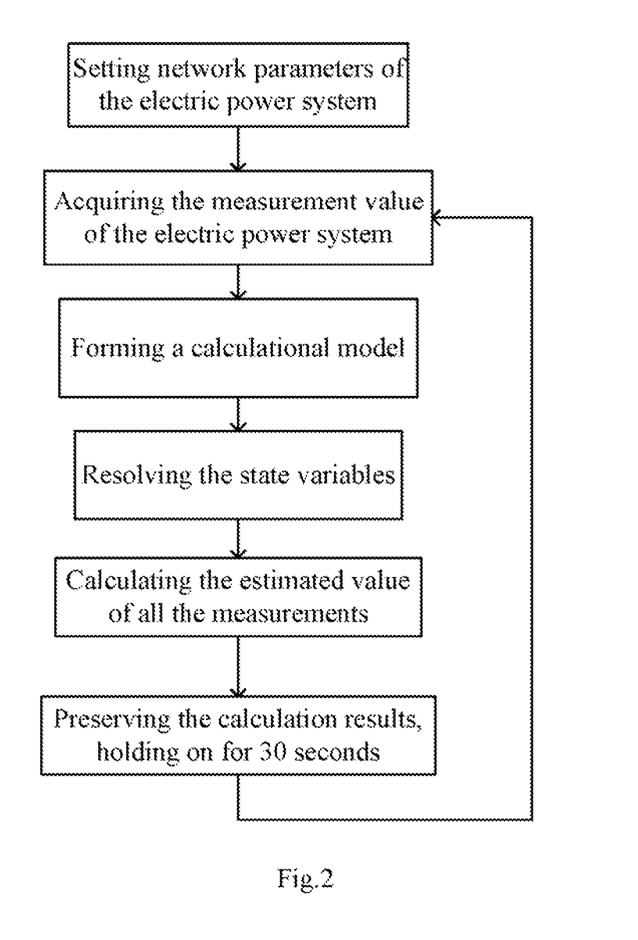
FIG. 2 is a flow block diagram according to the method of the present invention.
Figure 3:
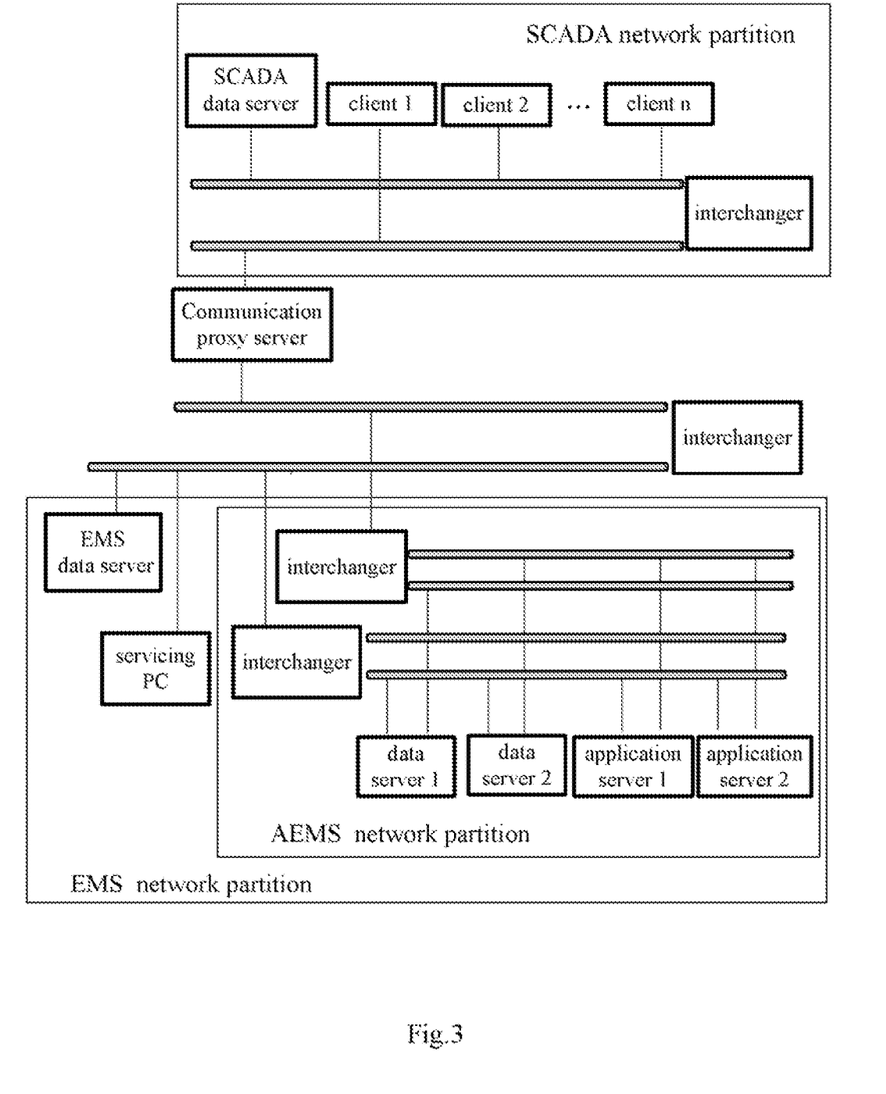
FIG. 3 illustrates the construction of the hardware.

The present invention can be applied in the real-time control system of practical power system named AEMS, the program flowchart of which is illustrated in FIG. 2 and the hardware construction is shown in FIG. 3. The servers of the system comprise two data servers and two application servers which all adopt Solaris 8 as their operating systems, two data servers and two application servers are inter-spare spinning reserves for each other. It is required for the system to connect into the energy management system (EMS) network and the SCADA network at the same time and keep certain independence. There are two interchangers adopted, through which the system is connected to the EMS network and the SCADA network respectively. The data servers are both dual-network card designed and connected with the above-mentioned interchangers respectively, thereby implementing inter-access between the AEMS partition network and the EMS network and SCADA network.

Figure 4:
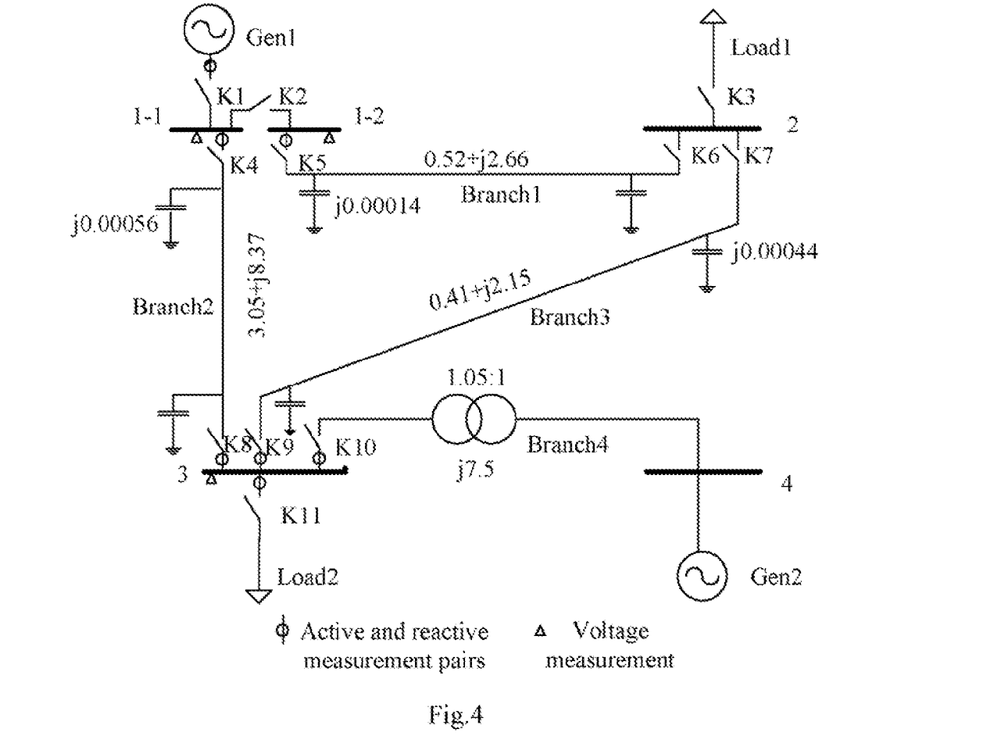
FIG. 4 illustrates the 4-node system.

The detailed description of the steps is set forth as follows by taking the 4-node system shown in FIG. 4 as an instance.
Step 1: Initialization
   Acquiring the network parameters of the power system from existing energy management system, the said network parameters comprise the series resistance, series reactance, parallel conductance and parallel susceptance of the transmission line, the ratio and impedance of the transformer.

The line parameters of the 4-node system are shown in table 1:

TABLE 1

| Branch number | F-node | End node | Resistance (Ω) | Reactance (Ω) | Susceptance against ground ($y_c$) | Ratio K |
|---|---|---|---|---|---|---|
| 1 | 1 | 2 | 0.52 | 2.66 | 0.00014 | — |
| 2 | 1 | 3 | 3.05 | 8.37 | 0.00056 | — |
| 3 | 2 | 3 | 0.41 | 2.15 | 0.00044 | — |
| 4 | 3 | 4 | 0.00 | 7.50 | — | 1.05 |

Step 2: Acquiring the SCADA Measurements

The measurements comprise the telemetry measurement and the remote signaling measurement. The telemetry measurements mainly comprise the voltage amplitude measurement, the generator active power measurement, the generator reactive power measurement, the load active power measurement, the load reactive power measurement, the reactive power measurement of the header point of the line, the active power measurement of the end point of the line, the reactive power measurement of the end point of the line, the current amplitude measurement of the line. The remote signaling measurements mainly comprise the measurement of the switch state of the switches and the disconnecting links and the position of the transformer taps. Each of the measuring points at least comprises the type, the serial number and the measurement value. The above-mentioned measurement value can be given by the file under offline condition, and derived from the SCADA system by API or TCP/IP communication protocol provided by SCADA system under online application condition. The SCADA system acquires data by polling mode with a usual cycle of 5~10 seconds.

Assuming the measurement data of the 4-node system at a particular time is shown in table 2, wherein, when the remote signaling measurement value is 1, it indicates that the switch is closed; when the remote signaling measurement value is 0, it indicates that the switch is open. The remote signaling measurement value is represented by named value, e.g. the units of the active power, the reactive power, the voltage amplitude and the angle are MW, MVAR, KV and "○" respectively.

TABLE 2

| | The telemetry measurement | | | The remote signaling measurement | |
|---|---|---|---|---|---|
| number | item | value | details | switch | value |
| 1 | Node injection power | 18.71 | generator active power on bus line 1-1 | K1 | 1 |
| 2 | Node injection power | 34.05 | generator reactive power on bus line 1-1 | K2 | 1 |
| 3 | Branch power flow | −41.79 | active power of branch 1 on port of bus line 1-2 | K3 | 1 |
| 4 | Branch power flow | 37.96 | reactive power of Branch 1 on port of bus line 1-2 | K4 | 1 |
| 5 | Branch power flow | −19.1 | active power of Branch 2 on port of bus line 1-1 | K5 | 1 |
| 6 | Branch power flow | −2.24 | reactive power of Branch 2 on port of bus line 1-1 | K6 | 1 |
| 7 | Branch power flow | 17.55 | active power of Branch 2 on port of bus line 3 | K7 | 1 |
| 8 | Branch power flow | −10.74 | reactive power of Branch 2 on port of bus line 3 | K8 | 1 |
| 9 | Branch power flow | 132.57 | active power of Branch 3 on port of bus line 3 | K9 | 1 |
| 10 | Branch power flow | 42.61 | reactive power of Branch 3 on port of bus line 3 | K10 | 1 |
| 11 | Node power injection | −49.49 | load active power on bus line 3 | K11 | 1 |
| 12 | Node power injection | −41.93 | load reactive power on bus line 3 | | |
| 13 | Branch power flow | −193.22 | active power on port of Bus line 3 of Branch 4 | | |

TABLE 2-continued

| | The telemetry measurement | | | The remote signaling measurement | |
|---|---|---|---|---|---|
| number | item | value | details | switch | value |
| 14 | Branch power flow | −71.08 | reactive power on port of Bus line 3 of Branch 4 | | |
| 15 | node voltage amplitude | 112.01 | voltage amplitude on bus line 1-1 | | |
| 16 | node voltage amplitude | 112.29 | voltage amplitude on bus line 1-2 | | |
| 17 | node voltage amplitude | 110.99 | voltage amplitude on bus line 3 | | |

Step 3: Forming a Computational Model

The ports of the switches, transmission lines, transformers, generators, capacitors and loads are referred to as nodes. Traversing all these nodes, merging the ones that are connected together by closed switches or disconnecting links in power network to be one node used for calculation according to the switching value, the nodes mentioned as follows all indicate the nodes used for calculation.

Redistributing the voltage amplitude measurement value, generator power measurement value and load power measurement value acquired from step 2 onto the nodes specifically by methods as follows: 1) averaging to get the voltage amplitude measurement values if the nodes have a plurality of voltage amplitude measurement values, 2) adopting the generator power from which the load power is taken away to be the injection power of the node, only if the power measurement happened on all the generators and loads on the node, then entering into the next step.

Figure 5:
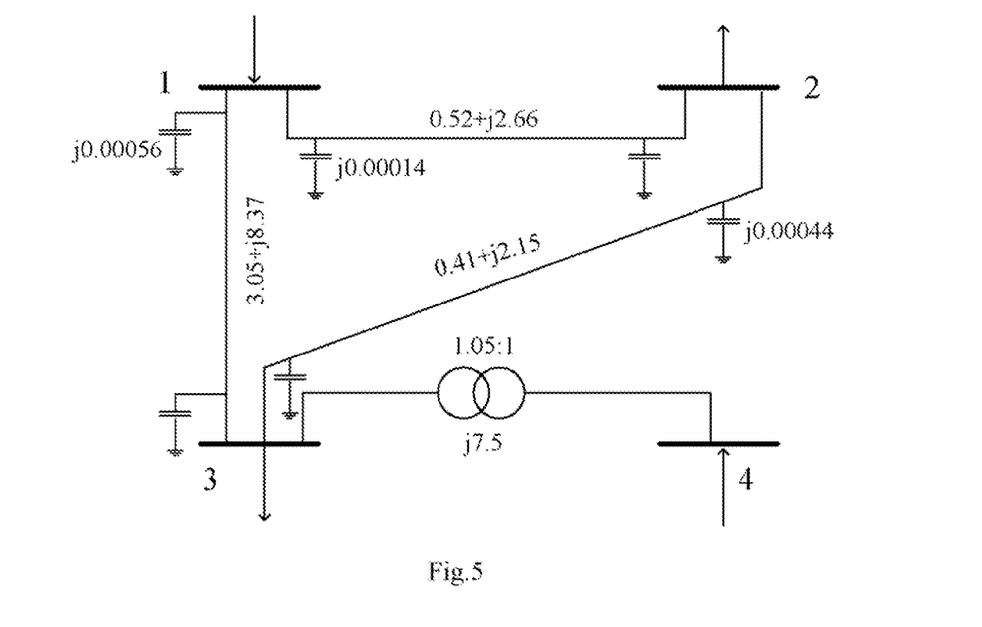
FIG. 5 shows the computational model of the 4-node system.

The bus lines 1-1 and 1-2 in the 4-node system are connected by switch K2, which emerge into a bus under the condition that K2 is closed, the said bus has a voltage amplitude measurement that is the average value of the voltage amplitude value on 1-1 and 1-2. The calculation model is shown in FIG. 5. The measurements after redistribution are shown in table 3.

output respectively. Adopting an optimization data model described as follows:

$$\min \sum_{i=1}^{m} \left( \frac{1}{1 + e^{-\beta_i(z_i - h_i(x) - a_i)}} + \frac{1}{1 + e^{\beta_i(z_i - h_i(x) + a_i)}} \right)$$

$$\text{s.t.} \begin{cases} \sum_{j \in i} v_i v_j (G_{ij} \cos\theta_{ij} + B_{ij} \sin\theta_{ij}) = 0 \\ \sum_{j \in i} v_i v_j (G_{ij} \sin\theta_{ij} - B_{ij} \cos\theta_{ij}) = 0 \end{cases} (i \in A)$$

$$\begin{cases} \sum_{l \in k} v_k v_l (G_{kl} \cos\theta_{kl} + B_{kl} \sin\theta_{kl}) \le P_{k\,max} \\ \sum_{l \in k} v_k v_l (G_{kl} \sin\theta_{kj} - B_{kl} \cos\theta_{kl}) \le Q_{k\,max} \end{cases} (k \in E).$$

The state variables derived from estimation by WLS estimator can be considered as the initial values under the condition of offline application, and the state variables derived from the previous estimation can be considered as the initial values under the condition of online application. Adopting the resolution method of the nonlinear optimization problem to resolve the value and then assuming the optimal solution as x*.

TABLE 3

| | Item | | | | | | | |
|---|---|---|---|---|---|---|---|---|
| | $P_1$ | $Q_1$ | $P_{12}$ | $Q_{12}$ | $P_{13}$ | $Q_{13}$ | $P_{31}$ | $Q_{31}$ |
| Measurement value | 18.71 | 34.05 | −41.79 | 37.96 | −19.1 | −2.24 | 17.55 | −10.74 |

| | Item | | | | | | | |
|---|---|---|---|---|---|---|---|---|
| | $P_{32}$ | $Q_{32}$ | $P_3$ | $Q_3$ | $P_{34}$ | $Q_{34}$ | $U_1$ | $U_3$ |
| Measurement value | 132.57 | 42.61 | −49.49 | −41.93 | −193.2 | −71.08 | 112.15 | 110.99 |

Step 4: Resolving the State Variables

Assuming a set A consisting of connection nodes, a set E consisting of generator nodes. $P_{k\,max}$ and $Q_{k\,max}$ indicate the maximum active power output and maximum reactive power Node 1 is considered as the referenced node of the voltage angle in the 4-node system, the vector z of the measurement value and parameters such as $\alpha_i$, $\beta_i$ are shown in table 4. The results of the calculation for the state variables are shown in diagram 5.

TABLE 4

| | i | | | | | | | |
|---|---|---|---|---|---|---|---|---|
| | 1 | 2 | 3 | 4 | 5 | 6 | 7 | 8 |
| $z_i$ | 18.71 | 34.05 | −41.79 | 37.96 | −19.1 | −2.24 | 17.55 | −10.74 |
| $\alpha_i$ | 0.777 | 1.1656 | 2.28 | 3.42 | 2.28 | 3.42 | 2.28 | 3.42 |
| $\beta_i$ | 12.869 | 8.5796 | 4.38596 | 2.924 | 4.386 | 2.92398 | 4.386 | 2.92398 |

| | i | | | | | | | |
|---|---|---|---|---|---|---|---|---|
| | 9 | 10 | 11 | 12 | 13 | 14 | 15 | 16 |
| $z_i$ | 132.57 | 42.61 | −49.49 | −41.93 | −193.2 | −71.08 | 112.15 | 110.99 |
| $\alpha_i$ | 2.28 | 3.42 | 2.28 | 3.42 | 2.28 | 3.42 | 2.64 | 2.64 |
| $\beta_i$ | 4.386 | 2.924 | 4.38596 | 2.924 | 4.386 | 2.92398 | 3.7879 | 3.78788 |

TABLE 5

| Node number | amplitude | Phase angle |
|---|---|---|
| 1 | 111.31 | 0 |
| 2 | 110.17 | −0.398 |
| 3 | 111.52 | 0.82 |
| 4 | 112.1 | 7.92 |

Step 5: Calculating the Estimated Values of all the Measurements

Resolve the estimated value of the measurement value by using the formula $z^* = h(x^*)$ and preserve the calculation results shown in table 6, wherein the said $x^*$ is derived from the previous step. Hold on for a few seconds and return to step 2 under the condition of online real-time calculation; the whole calculation is finished under the condition of offline calculation.

TABLE 6

| Measurement item | Measurement value | Estimated value |
|---|---|---|
| $P_1$ | 18.71 | 20.33 |
| $Q_1$ | 34.05 | 35.9 |
| $P_{12}$ | −41.79 | 39.87 |
| $Q_{12}$ | 37.96 | 38.3 |
| $P_{13}$ | −19.1 | −19.5 |
| $Q_{13}$ | −2.24 | −2.39 |
| $P_{31}$ | 17.55 | 19.6 |
| $Q_{31}$ | −10.74 | −11.23 |
| $P_{32}$ | 132.57 | 130.2 |
| $Q_{32}$ | 42.61 | 40.77 |
| $P_3$ | −49.49 | −46.43 |
| $Q_3$ | −41.93 | −41.74 |
| $P_{34}$ | −193.22 | −196.27 |
| $Q_{34}$ | −71.08 | −71.27 |
| $U_1$ | 112.15 | 111.31 |
| $U_3$ | 110.99 | 111.52 |

The invention claimed is:

1. A method for state estimation based on measured data of a data-acquisition system in a power system is characterized by its implementation on a computer according to the following steps comprising:

a step 1 of defining ports of switches, power transmission lines, transformers, generators, capacitors and loads in the power system to be system nodes, and acquiring network parameters of said power system from its energy management system, said network parameters comprise branch numbers of the power transmission lines, node serial numbers of a header nodes and an end nodes of the system nodes, a series resistance, a series reactance, a shunt conductance, a shunt admittance, and a transformation ratio and impedance of said transformers;

a step 2 of acquiring a telemetry measurement value and a remote signaling measurement value from a network data server of a Supervisory Control and Data Acquisition (SCADA), wherein said telemetry measurement value comprises: voltage magnitude, active power of a generator, reactive power of said generator, active power of a load, reactive power of said load, active power of a first end of a line, reactive power of said first end of said line, active power of the tail end of said line, reactive power of the tail end of said line, and current amplitude of said line;

wherein said remote signaling measurement value comprises: a switch state of the switches and disconnecting links, and a tap position of said transformers, wherein said remote signaling measurement value is 1 when any one of said switches or said disconnecting links is closed, and said measurement value is 0 when any one of said switches or said disconnecting links is open;

wherein the data acquisition of said SCADA system is implemented by a polling mode with a cycle time 5~10 seconds, each of one or more measuring points at least comprises a type thereof, a serial number thereof and a measurement value thereof;

a step 3 of constructing a computational model;

a step 3.1 of traversing said system nodes, merging said system nodes connected together by closed switches or disconnecting links into one system bus used for calculation according to the remote signaling measurement values in said step 2, defining buses without said generator or said load as link buses, and defining buses with said generator as generator buses;

a step 3.2 of distributing voltage magnitude measurements, active power measurement of said generators, reactive power measurement of said generator, active power measurements of said load, and reactive power measurement of said load acquired from said step 2 to their corresponding buses according to the ways as follows:

averaging to get a voltage magnitude measurement value if said buses include a plurality of voltage magnitude measurement values, adopting the power measurement of the generator from which the power measurement of the load is taken away to be an injection power of said bus only if the power measurement happened on all the generators and loads on said bus;

a step 4 of taking the voltage magnitude and the voltage angle of said bus as a state variable x, and taking one of said buses as a reference bus of the voltage angle, then resolving the following equations to get an optimal solution "x*" of said state variable;

a step 4.1 of forming said link buses to a set A while forming said generator buses to a set E, using $P_{kmax}$ and $Q_{kmax}$ to indicate a maximum active power output and a maximum reactive output of a generator bus k respectively;

a step 4.2 of resolving an optimal state variable solution x* by adopting the following optimization model:

$$\min \sum_{i=1}^{m} \left( \frac{1}{1+e^{-\beta_i(z_i - h_i(x) - a_i)}} + \frac{1}{1+e^{\beta_i(z_i - h_i(x) + a_i)}} \right)$$

$$\text{s.t.} \begin{cases} \sum_{j \in t} v_t v_j (G_{tj}\cos\theta_{tj} + B_{tj}\sin\theta_{tj}) = 0 \\ \sum_{j \in t} v_t v_j (G_{tj}\sin\theta_{tj} - B_{tj}\cos\theta_{tj}) = 0 \end{cases} (t \in A)$$

$$\begin{cases} \sum_{l \in k} v_k v_l (G_{kl}\cos\theta_{kl} + B_{kl}\sin\theta_{kl}) \leq P_{k\ max} \\ \sum_{l \in k} v_k v_l (G_{kl}\sin\theta_{kj} - B_{kl}\cos\theta_{kl}) \leq Q_{k\ max} \end{cases} (k \in E)$$

wherein, A is a set consisting of link buses, E is a set consisting of generator buses, $v_t$, $v_j$, $v_k$ and $v_l$ are the voltage magnitude of bus t, bus j, bus k and bus l respectively, j∈t denotes that bus j is connected with bus t by a line,
l∈k denotes that bus l is connected with bus k by a line,
bus t is a link bus, bus k is a generator bus,
$G_{tj}$, $B_{tj}$, $G_{kl}$, $B_{kl}$, are elements of an admittance matrix,
θ is the voltage angle difference between node t and node j,
$θ_{kl}$ is the voltage angle difference between node k and node l,
$z_i$ is a measurement value under the i-th measurement,
$h_i(x)$ is a measurement function under the i-th measurement,
$α_i$ is a parameter related to the i-th measurement;
for the voltage measuring points: $α_i=0.02\times|z_{ibase}|$,
for the active power measuring points: $α_i=0.02\times|z_{ibase}|$,
for the reactive power measuring points: $α_i=0.03\times|z_{ibase}|$,
the value of $z_{ibase}$ is related to the i-th measurement and is predetermined corresponding to different voltage levels,
$β_i$ is the parameter related to the said $α_i$,
$β_i = c/α_i$, c is a constant, c=5~10;

a step 5 of calculating an estimated value z*=h(x*) according to an optimized solution x* derived from block 4,
the voltage magnitude of bus i is: $h(x^*)=v_i^*$,
the active injection power of bus i is:

$$h(x^*) = \sum_{j \in i} v_i^* v_j^* (G_{ij}\cos(\theta_i^* - \theta_j^*) + B_{ij}\sin(\theta_i^* - \theta_j^*)),$$

the reactive injection power of bus i is:

$$h(x^*) = \sum_{j \in i} v_i^* v_j^* (G_{ij}\sin(\theta_i^* - \theta_j^*) - B_{ij}\cos(\theta_i^* - \theta_j^*)),$$

$v_i^*$, $v_j^*$, $θ_i^*$, $θ_j^*$ are all the optimized solutions of the state variables which can be represented by x*;

a step 6 of determining whether each of the estimated values of the measurements is qualified or not according to the following formula:

if $|z_i - z_i^*| \leq α_i$, the estimated value is qualified.

2. The method for state estimation based on the measured data of a data-acquisition system in a power system according to claim 1, wherein said $z_{base}$ under the power measurement of the line in said step 2 can be assigned with values as follows: assigning a value 1083MVA under the condition where the voltage level is 500 kv, assigning a value 686MVA under the condition where the voltage level is 330 kv, assigning a value 305MVA under the condition where the voltage level is 220 kv, assigning a value 114MVA under the condition where the voltage level is 110 kv, assigning a value 69.7MVA under the condition where the voltage level is 66 kv.

3. The method for state estimation based on the measured data of a data-acquisition system in an electric power system according to claim 1, characterized in that said $z_{base}$ under the voltage magnitude measurement in said step 2 can be assigned with values as follows: assigning a value 600 kv under the condition where the level is 500 kv, assigning a value 396 kv under the condition where the level is 330 kv, assigning a values 264 kv under the condition where the level is 220 kv, assigning a value 132 kv under the condition where the level is 110 kv, assigning a value 79.2 kv under the condition where the level is 66 kv.

4. The method for state estimation bad on the measured data of a data-acquisition system in an electric power system according to claim 1, wherein said $z_{base}$ values are the apparent power of the generator under the power measurement of the generator in said step 2.

* * * * *